United States Patent
Lillicrap et al.

(10) Patent No.: US 10,776,692 B2
(45) Date of Patent: Sep. 15, 2020

(54) CONTINUOUS CONTROL WITH DEEP REINFORCEMENT LEARNING

(71) Applicant: DeepMind Technologies Limited, London (GB)

(72) Inventors: Timothy Paul Lillicrap, London (GB); Jonathan James Hunt, London (GB); Alexander Pritzel, London (GB); Nicolas Manfred Otto Heess, London (GB); Tom Erez, London (GB); Yuval Tassa, London (GB); David Silver, Hitchin (GB); Daniel Pieter Wierstra, London (GB)

(73) Assignee: DeepMind Technologies Limited, London (GB)

( * ) Notice: Subject to any disclaimer, the term of this patent is extended or adjusted under 35 U.S.C. 154(b) by 1090 days.

(21) Appl. No.: 15/217,758

(22) Filed: Jul. 22, 2016

(65) Prior Publication Data
US 2017/0024643 A1 Jan. 26, 2017

Related U.S. Application Data

(60) Provisional application No. 62/196,854, filed on Jul. 24, 2015.

(51) Int. Cl.
*G06N 3/08* (2006.01)
*G06N 3/00* (2006.01)
*G06N 3/04* (2006.01)

(52) U.S. Cl.
CPC .............. *G06N 3/08* (2013.01); *G06N 3/006* (2013.01); *G06N 3/0454* (2013.01); *G06N 3/084* (2013.01)

(58) Field of Classification Search
CPC ........ G06N 3/08; G06N 3/084; G06N 3/0454; G06N 3/006; G06N 3/04
See application file for complete search history.

(56) References Cited

U.S. PATENT DOCUMENTS 5,479,576 A * 12/1995 Watanabe ................ G06N 3/08
706/25
8,392,346 B2 3/2013 Ueda et al.
(Continued)

FOREIGN PATENT DOCUMENTS

JP 2013081683 5/2013
RU 2542901 2/2015

OTHER PUBLICATIONS

Reinforcement Learning Using a Continuous Time Actor-Critic Framework with Spiking Neurons Fre'maux et al. (Year: 2013).*
(Continued)

*Primary Examiner* — Kakali Chaki
*Assistant Examiner* — Ababacar Seck
(74) *Attorney, Agent, or Firm* — Fish & Richardson P.C.

(57) ABSTRACT

Methods, systems, and apparatus, including computer programs encoded on computer storage media, for training an actor neural network used to select actions to be performed by an agent interacting with an environment. One of the methods includes obtaining a minibatch of experience tuples; and updating current values of the parameters of the actor neural network, comprising: for each experience tuple in the minibatch: processing the training observation and the training action in the experience tuple using a critic neural network to determine a neural network output for the experience tuple, and determining a target neural network output for the experience tuple; updating current values of the parameters of the critic neural network using errors between the target neural network outputs and the neural network outputs; and updating the current values of the parameters of the actor neural network using the critic neural network.

20 Claims, 4 Drawing Sheets

(56) References Cited

U.S. PATENT DOCUMENTS

| | | | |
|---|---|---|---|
| 9,015,093 B1* | 4/2015 | Commons | G01C 21/3602 706/26 |
| 2005/0245303 A1 | 11/2005 | Graepel et al. | |
| 2013/0325776 A1 | 12/2013 | Ponulak et al. | |
| 2015/0100530 A1* | 4/2015 | Mnih | G06N 3/0454 706/25 |

OTHER PUBLICATIONS

Deep Learning for Actor-Critic Reinforcement Learning Xueli Jia (Year: 2015).*
Actor-Critic Reinforcement Learning with Energy-Based Policies Heess et al. (Year: 2012).*
Playing Atari with Deep Reinforcement Learning Minih et al. (Year: 2013).*
Deterministic Policy Gradient Algorithms Silver et al. (2014).*
Actor-Critic-Based Optimal Tracking for Partially Unknown Nonlinear Discrete-Time Systems Kiumarsiet al. (Year: 2015).*
CA Office Action issued in Canadian Application No. 2993551, dated Nov. 25, 2019, 6 pages.
SG Written Opinion issued in Singaporean Application No. 11201800544U, dated Jan. 2, 2019, 7 pages.
JP Office Action in Japanese Application No. 2018-523386, dated Jun. 20, 2019, 8 pages (with English translation).
Shibata et al, "Active Perception and Recognition Learning System Based on Actor-Q Architecture," Systems and Computers in Japan, 2002, 11 pages.
IL Office Action in Israeli Appln. No. 257103, dated Dec. 30, 2019, 6 pages (with English translation).
KR Office Action in Korean Appln. No. 10-2018-7005435, dated Jan. 17, 2020, 7 pages (with English translation).
Deisenroth et al., "A Survey on Policy Search for Robotics," Foundations and Trends in Robotics, 2(1-2):1-142, 2013.
Deisenroth et al., "PILCO: A model-based and data-efficient approach to policy search," Proceedings of the 28th International Conference on machine learning (ICML-11), 2011, pp. 465-472.
Glascher et al., "States versus rewards: dissociable neural prediction error signals underlying model-based and model-free reinforcement learning," Neuron, 66(4):585-595, May 2010.
Glorot et al., "Deep sparse rectifier networks," Proceedings of the 14th International Conference on Artificial Intelligence and Statistics. JMLR W&CP Volume. vol. 15, 2011, pp. 315-323.
Hafner et al., "Reinforcement learning in feedback control," Machine learning 84(1-2):137-169, Jul. 2011.
Hasselt, "Double Q-learning". In: Advances in Neural Information Processing Systems, 2010, pp. 2613-2621.
Ioffe et al., "Batch normalization: Accelerating deep network training by reducing internal covariate shift," arXiv preprint arXiv:1502.03167, Mar. 2015, pp. 1-11.
Kingma et al., "Adam: A Method for Stochastic Optimization," arXiv preprint arXiv:1412.6980, Jul. 2015, pp. 1-15.
Koutnik et al., "Evolving deep unsupervised convolutional networks for vision-based reinforcement learning," Proceedings of the 2014 conference on Genetic and evolutionary computation, ACM, Jul. 2014, pp. 541-548.
Koutnik et al., "Online Evolution of Deep Convolutional Network for Vision-Based Reinforcement Learning," From Animals to Animats 13, Springer, 2014, pp. 260-269.
Krizhevsky et al., "ImageNet Classification with Deep Convolutional Neural Networks," Advances in Neural Information Processing Systems, 2012, pp. 1097-1105.
Levine et al., "End-to-End Training of Deep Visuomotor Policies," Journal of Machine Learning Research 17, Apr. 2016, pp. 1-40.
Mnih et al. "Human-level control through deep reinforcement learning". Nature 518.7540, Feb. 2015, pp. 529-533.
Mnih et al. "Playing atari with deep reinforcement learning". In: arXiv preprint arXiv:1312.5602, Dec. 2013, pp. 1-9.
Schulman et al., "Trust Region Policy Optimization," arXiv preprint arXiv:1502.05477, Feb. 2015, pp. 1-16.
Silver et al. "Deterministic Policy Gradient Algorithms," Proceedings of the $31^{st}$ International Conference on Machine Learning, 2014, 9 pages.
Tassa et al., "Synthesis and stabilization of complex behaviors through online trajectory optimization," Intelligent Robots and Systems (IROS), 2012 IEEE/RSJ International Conference on. IEEE, Oct. 2012, pp. 4906-4913.
Todorov et al., "A generalized iterative LQG method for locally-optimal feedback control of constrained nonlinear stochastic systems," American Control Conference, 2005. Proceedings of the 2005. IEEE. 2005, pp. 300-306.
Todorov et al., "MuJoCo: A physics engine for model-based control," Intelligent Robots and Systems (IROS), 2012 IEEE/RSJ International Conference on. IEEE, Oct. 2012, pp. 5026-5033.
Uhlenbeck et al., "On the theory of the Brownian motion," Physical review 36.5, Sep. 1930, pp. 823-841.
Wahlstrom et al., "From Pixels to Torques: Policy Learning with Deep Dynamical Models," arXiv preprint arXiv:1502.02251, Jun. 2015, pp. 1-9.
Watkins et al., "Q-learning," Machine learning, 8(3-4):279-292, May 1992.
Wawrzynski et al., "Autonomous reinforcement learning with experience replay," Neural Networks 41 (2013), pp. 156-167.
Wawrzynski, "Real-time reinforcement learning by sequential actor—critics and experience replay," Neural Networks, 22(10):1484-1497, Dec. 2009.
International Search Report and Written Opinion in International Application No. PCT/US2016/043716, dated Oct. 14, 2016, 12 pages.
AU Office action issued in Australian Application No. 2016297852, dated Nov. 5, 2018, 3 pages.
CA Office Action issued in Canadian Application No. 2993551, dated Oct. 24, 2018, 6 pages.
RU Office Action issued in Russian Application No. 2018106248/08(009576), dated Oct. 23, 2018, 13 pages (with English translation).

* cited by examiner

CONTINUOUS CONTROL WITH DEEP REINFORCEMENT LEARNING

CROSS REFERENCE TO RELATED APPLICATIONS

This application is a non-provisional of and claims priority to U.S. Provisional Patent Application No. 62/196,854, filed on Jul. 24, 2015, the entire contents of which are hereby incorporated by reference.

BACKGROUND

This specification relates to selecting actions to be performed by a reinforcement learning agent.

Reinforcement learning agents interact with an environment by receiving an observation that characterizes the current state of the environment, and in response, performing an action. Some reinforcement learning agents use neural networks to select the action to be performed in response to receiving any given observation.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies that relate to reinforcement learning.

The subject matter described in this specification can be implemented in particular embodiments so as to realize one or more of the following advantages. A reinforcement learning system can effectively and directly learn an effective action selection policy for an agent in high-dimensional, continuous action spaces, i.e., by training an actor neural network as described in this specification. In particular, by training the actor neural network as described in this specification, the reinforcement learning system can effectively learn an effective action selection policy even for tasks that require fine control of actions and when the action space is intractable for discretizing and then exploring effectively. Additionally, the reinforcement learning system can learn an effective policy both from observations that are low-dimensional observations and from observations that are high-dimensional pixel inputs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that selects actions to be performed by a reinforcement learning agent interacting with an environment. In order to interact with the environment, the agent receives data characterizing the current state of the environment and performs an action from a continuous action space in response to the received data. Data characterizing a state of the environment will be referred to in this specification as an observation.

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be points in a space of possible control inputs to control the simulated user or simulated vehicle.

In some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be points in a space of possible control inputs to control the robot or the autonomous vehicle.

In some cases, the observations characterize states of the environment using low-dimensional feature vectors that characterize the state of the environment. In these cases, values of different dimensions of the low-dimensional feature vectors may have varying ranges.

In some other cases, the observations characterize states of the environment using high-dimensional pixel inputs from one or more images that characterize the state of the environment, e.g., images of the simulated environment or images captured by sensors of the mechanical agent as it interacts with the real-world environment.

Figure 1:
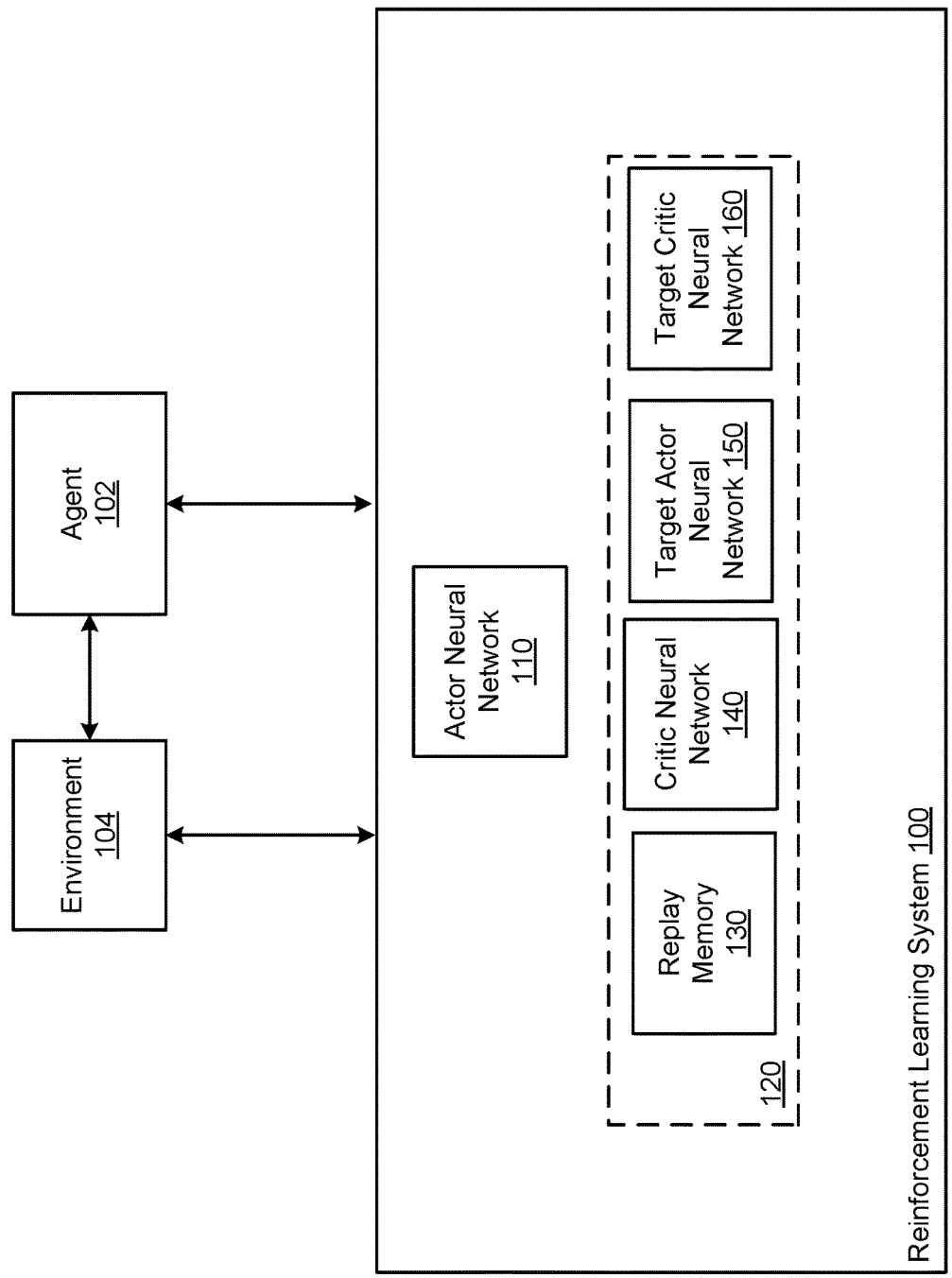
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions to be performed by a reinforcement learning agent 102 interacting with an environment 104. That is, the reinforcement learning system 100 receives observations, with each observation characterizing a respective state of the environment 104, and, in response to each observation, selects an action from a continuous action space to be performed by the reinforcement learning agent 102 in response to the observation.

In particular, the reinforcement learning system 100 selects actions using an actor neural network 110. The actor neural network 110 is a neural network that is configured to receive an observation and to process the observation to map the observation to a next action, i.e., to a point in the continuous action space that defines an action that should be performed by the agent in response to the observation.

To allow the agent 102 to effectively interact with the environment, the reinforcement learning system 100 trains the actor neural network 110 to determine trained values of the parameters of the actor neural network 110.

Once the actor neural network 110 has been trained, the reinforcement learning system 100 can effectively use the actor neural network 110 to select actions to be performed by the agent 104. In particular, when an observation is received, the reinforcement learning system 100 can process the observation using the actor neural network 110 to map the observation to a new action in accordance with the trained values of the parameters of the actor neural network 110 and then direct the agent 102 to perform the new action in response to the observation, i.e., by sending instructions to the agent 102 that cause the agent to perform the new action.

To assist in the training of the actor neural network 110, the reinforcement learning system 100 maintains training components 120 that include a replay memory 130, a critic neural network 140, a target actor neural network 150, and a target critic neural network 160.

The replay memory 130 stores experience tuples generated as a consequence of the interaction of the agent 102 with the environment 104 for use in training the actor neural network 110.

In particular, each experience tuple in the replay memory includes a training observation that characterizes a training state of the environment, an action performed by the agent 102 in response to the training observation, a training reward received by the system 100 in response to the agent 102 performing the action, and a next observation characterizing a next state of the environment, i.e., the state that the environment transitioned into after the agent performed the action.

The reinforcement learning system 100 generates the experience tuples from the interactions of the agent 102 with the environment 104 during the training of the actor neural network 110. An example process for generating an experience tuple during training is described in more detail below with reference to FIG. 2.

The critic neural network 140 is a neural network that is configured to receive as input an action and an observation and to process the action and the observation to generate a neural network output. As will be described in more detail below, during the training, the reinforcement learning system 100 adjusts the values of the parameters of the critic neural network 140 and uses the critic neural network 140 in updating the values of the parameters of the actor neural network 110.

In some implementations, the critic neural network 140, the actor neural network 110, or both include one or more batch normalization layers in order to minimize covariance shift during training. Batch normalization layers are described in more detail in Ioffe, Sergey and Szegedy, Christian. *Batch normalization: Accelerating deep network training by reducing internal covariate shift*. arXiv preprint arXiv:1502.03167, 2015.

The target actor neural network 150 is a neural network that is the same as, i.e., has the same neural network architecture as, the actor neural network 110, but that has possibly different parameter values from those of the actor neural network 110.

Similarly, the target critic neural network 160 is a neural network that is the same as the critic neural network 130 but that has possibly different parameter values from the critic neural network 130.

To train the neural network using the training components 120, the reinforcement learning system 100 repeatedly selects minibatches of experience tuples from the replay memory 130. Each minibatch of experience tuples includes a predetermined number, e.g., a predetermined number of randomly selected experience tuples.

For each experience tuple in a given selected minibatch, the reinforcement learning system 100 uses the critic neural network 140, the target actor neural network 150, and the target critic neural network 160 to determine updates for the current values of the parameters of the actor neural network 110 and the current values of the parameters of the critic neural network 150 and then adjusts the current values of the parameters of the actor neural network 110 and the current values of the parameters of the critic neural network 150 using the updates. Generating these updates and adjusting the current values of the parameters of the critic neural network 140 and the actor neural network 110 will be described in more detail below with reference to FIG. 3.

During the training, the reinforcement learning system 100 also periodically updates the values of the parameters of the target critic neural network 160 and the values of the parameters of the target actor neural network 150 so that the values slowly track the changes to the values of the parameters of the critic neural network 140 and the values of the parameters of the actor neural network 110, respectively.

Once a minibatch of experience tuples has been used in training, the reinforcement learning system 100 can remove the experience tuples in the minibatch from the replay memory 120.

Generally, during the training, the reinforcement learning system 100 generates experience tuples and adds the generated tuples to the replay memory 120 independently of, i.e., asynchronously from, sampling experience tuples from the replay memory 120 and adjusting the parameters of the actor neural network 110.

Figure 2:
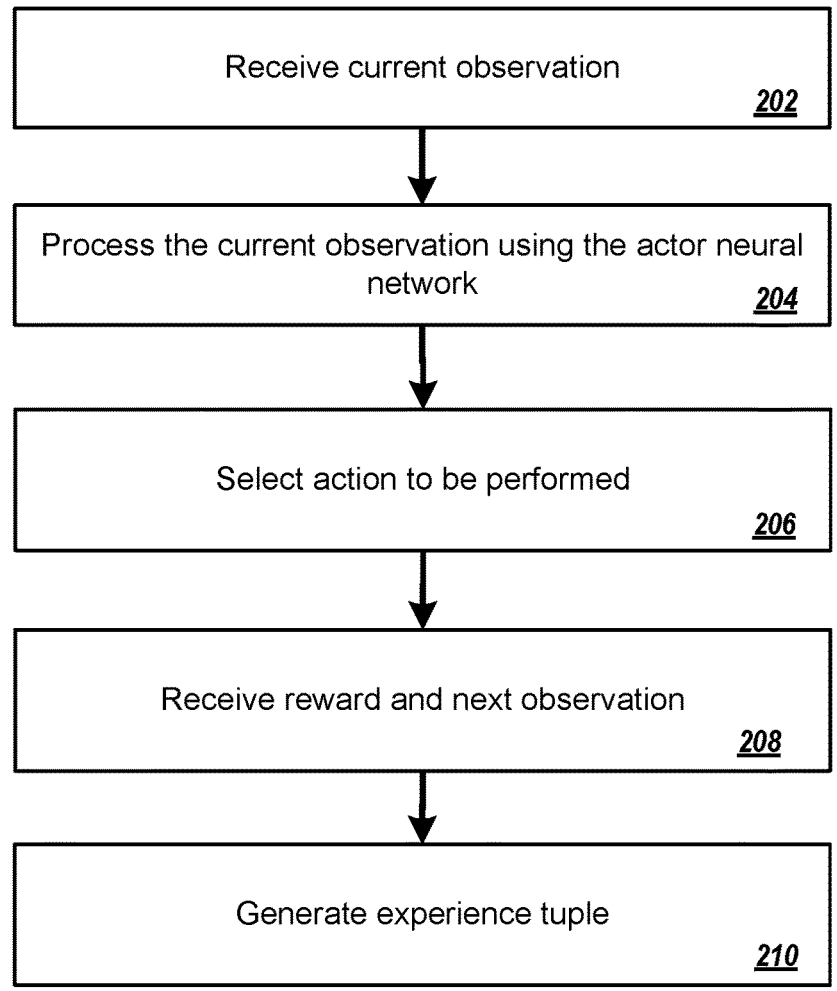
FIG. 2 is a flow diagram of an example process for adding an experience tuple to a replay memory.

FIG. 2 is a flow diagram of an example process 200 for adding an experience tuple to a replay memory. For convenience, the process 200 will be described as being performed by a system of one or more computers located in one or more locations. For example, a reinforcement learning system, e.g., the reinforcement learning system 100 of FIG. 1, appropriately programmed in accordance with this specification, can perform the process 200.

The system receives a current observation characterizing the current state of the environment (step 202).

The system processes the observation using an actor neural network in accordance with current values of the parameters of the actor neural network (step 204). As described above, the actor neural network is configured to map the current observation to a next action, i.e., a point in the continuous action space, in accordance with the current values of the parameters.

The system selects an action to be performed by the agent using the next action (step 206).

In some implementations, the system selects the next action as the action to be performed by the agent.

In some other implementations, to encourage exploration of the action space during training, the system samples from a noise process to obtain a noise factor and then adjusts the next action by the noise factor to generate the action to be performed by the agent.

The noise process used to obtain the noise factor can be chosen to suit the environment. For example, for some environments, the noise process may be an Ornstein-Uhlenbeck process to generate temporally correlated exploration. Ornstein-Uhlenbeck processes are described in more detail in George E Uhlenbeck and Leonard S Ornstein. "On the theory of the Brownian motion". In: Physical review 36.5 (1930), p. 823.

The system receives a reward and a next observation (step 208). The next observation characterizes the next state of the environment, i.e., the state that the environment transitioned into as a result of the agent performing the selected action, and the reward is a numeric value that is received by the system from the environment as a result of the agent performing the selected action.

The system generates an experience tuple that includes the current observation, the selected action, the reward, and the next observation and stores the generated experience tuple in a replay memory for use in training the actor neural network (step 210).

Figure 3:
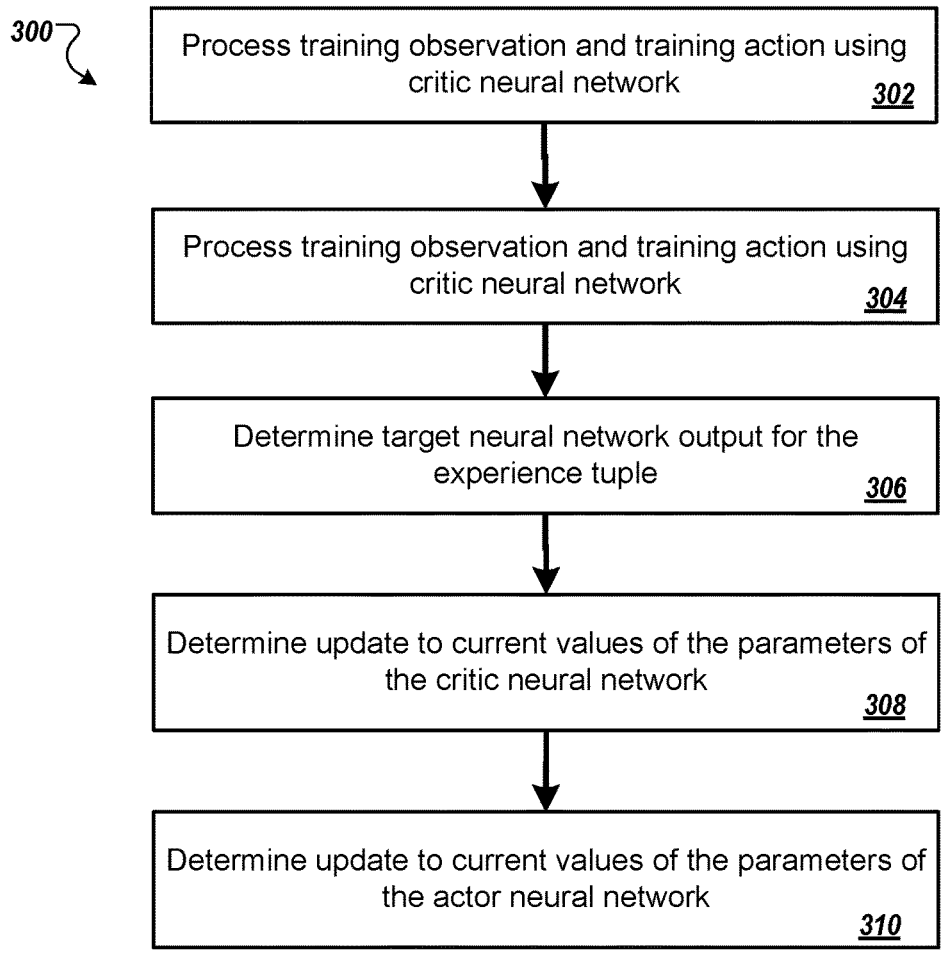
FIG. 3 is a flow diagram of an example process for determining an update to the current values of the parameters of the actor neural network.

FIG. 3 is a flow diagram of an example process 300 for determining an update to the current values of the parameters of the actor neural network. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system receives an experience tuple (step 302). The experience tuple is one of the experience tuples in a minibatch of experience tuples sampled from the replay memory by the system.

The experience tuple includes a training observation characterizing a training state of the environment, a training action from the continuous space of actions performed by the agent in response to receiving the training observation, a training reward received by the agent for performing the training action, and a next training observation characterizing a next training state of the environment.

The system processes the training observation and the selected action in the experience tuple using the critic neural network to determine a neural network output for the experience tuple in accordance with current values of the parameters of the critic neural network (step 304).

The system determines a target neural network output for the experience tuple from the training reward in the experience tuple and the next training observation in the experience tuple (step 306). Generally, the system determines the target neural network output using the target actor neural network and the target critic neural network. Determining the target neural network output is described in more detail below with reference to FIG. 4.

The system determines an update for the current values of the parameters of the critic neural network using an error between the target neural network output for the experience tuple and the neural network output that was generated by the critic neural network for the experience tuple (step 308). That is, the system can determine an update to the current values of the parameters that reduces the error using conventional machine learning training techniques, e.g., by performing an iteration of gradient descent with backpropagation. As will be clear from the description of FIG. 4, by updating the current values of the parameters in this manner, the system trains the critic neural network to generate neural network outputs that represent time-discounted total future rewards that will be received in response the agent performing a given action in response to a given observation.

The system determines an update for the current values of the parameters of the actor neural network using the critic neural network (step 310).

In particular, to determine the update, the system processes the training observation in the tuple using the actor neural network in accordance with the current values of the parameters to generate a next action for the training observation.

The system then determines a parameter update for the current values of the actor neural network that is dependent on, i.e., is the product of or is a different combination of, (i) the gradient of the critic neural network with respect to the next action taken at the training observation—next action input pair and in accordance with the current values of the parameters of the critic neural network and (ii) the gradient of the actor neural network with respect to the parameters of the actor neural network taken at the training observation and in accordance with current values of the parameters of the actor neural network. The system can determine gradient (i) and gradient (ii) by backpropagating the respective gradients through the respective networks.

Generally, the system performs the process 300 for each experience tuple in a given minibatch to determine, for each tuple, an update for the parameters of the critic neural network and an update for the parameters of the actor neural network. Once the updates for each tuple in the minibatch have been determined, the system updates the current values of the parameters of the actor neural network and the current values of the parameters of the critic neural network using the updates for the tuples in the minibatch. For example, for each network, the system can add each update to the current values of the parameters of the network to update those values.

Once updated values of the parameters of actor neural network and the critic neural network have been determined, the system updates the current values of the target critic neural network parameters and the target actor neural network parameters so that the values slowly track the changes to the values of the parameters of the critic neural network and the value of the parameters of the actor neural network, respectively. In particular, the system constrains the values of the target critic neural network parameters and the target actor neural network parameters to change slowly during the training in order to improve the stability of the training process.

For example, the updated values of one of the target networks may be a linear interpolation between the updated values of the corresponding actor or critic network and the current values of the target network, with the current values of the target network being weighted more heavily in the interpolation.

By repeatedly performing the process 300 on multiple different minibatches of experience tuples, the system can train the actor neural network to determine trained values of the parameters of the actor neural network and to allow the actor neural network to effectively be used to select actions to be performed by the agent in interacting with the environment.

Figure 4:
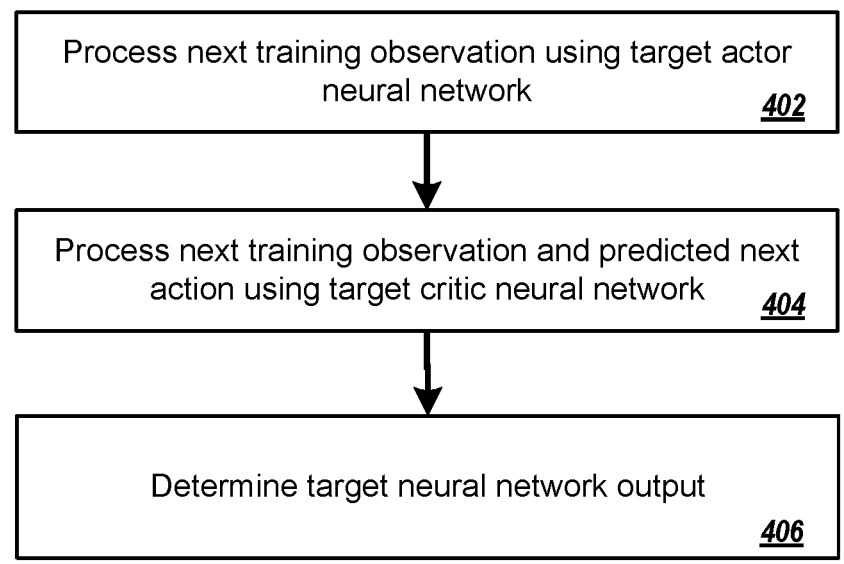
FIG. 4 is a flow diagram of an example process for determining a target neural network output for an experience tuple.

FIG. 4 is a flow diagram of an example process 400 for determining a target neural network output for an experience tuple. For convenience, the process 400 will be described as being performed by a system of one or more computers located in one or more locations. For example, a reinforcement learning system, e.g., the reinforcement learning system 100 of FIG. 1, appropriately programmed in accordance with this specification, can perform the process 400.

The system processes the next training observation in the experience tuple using a target actor neural network in accordance with current values of the parameters of the target actor neural network to generate a predicted next action (step 402). As described above, the target actor neural network is identical to the actor neural network, but with possibly different parameter values.

The system processes the next training observation and the predicted next action using a target critic neural network in accordance with current values of the parameters of the target critic neural network to generate a predicted next neural network output (step 404). As described above, the target critic neural network is identical to the critic neural network, but with possibly different parameter values.

The system determines the target neural network for the experience tuple from the training reward and the predicted neural network output for the experience tuple (step 406). In particular, the system multiplies the predicted neural network output by a predetermined time discount factor and then sums the resulting product and the training reward to generate the target neural network output for the experience tuple.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for training an actor neural network used to select actions to be performed by an agent that interacts with an environment by receiving observations characterizing a current state of the environment and performing an action selected from a continuous space of actions, wherein the actor neural network maps observations to next actions in accordance with current values of parameters of the actor neural network, and wherein the method comprises:

obtaining a minibatch of experience tuples from a replay memory, each experience tuple comprising a training observation characterizing a training state of the environment, a training action from the continuous space of actions performed by the agent in response to receiving the training observation, a training reward received by the agent for performing the training action, and a next training observation characterizing a next training state of the environment; and updating the current values of the parameters of the actor neural network using the minibatch of experience tuples, comprising:

for each experience tuple in the minibatch:

processing the training observation and the training action in the experience tuple using a critic neural network to determine a neural network output for the experience tuple in accordance with current values of parameters of the critic neural network, and determining a target neural network output for the experience tuple from the training reward in the experience tuple and the next training observation in the experience tuple, the determining comprising:

processing the next training observation using a target actor neural network to determine a predicted next action for the experience tuple in accordance with current values of parameters of the target actor neural network, wherein the target actor neural network is identical to the actor neural network but the current values of the parameters of the target actor neural network are different from the current values of the parameters of the actor neural network;

processing the next training observation and the predicted next action for the experience tuple using a target critic neural network to generate a predicted next neural network output in accordance with current values of parameters of the target critic neural network, wherein the target critic neural network is identical to the critic neural network but the current values of the parameters of the target critic neural network are different from the current values of the parameters of the critic neural network; and determining the target neural network output for the experience tuple from the training reward and the predicted next neural network output for the experience tuple;

updating the current values of the parameters of the critic neural network using errors between the target neural network outputs and the neural network outputs for the experience tuples in the minibatch; and updating current values of the parameters of the actor neural network using the critic neural network.

2. The method of claim 1, further comprising:
updating the current values of the parameters of the target actor neural network using the updated values of the parameters of the actor neural network; and
updating the current values of the parameters of the target critic neural network using the updated values of the parameters of the critic neural network.

3. The method of claim 2, wherein the current values of the parameters of the target actor neural network and the target critic neural network are constrained to change slowly during the training of the actor neural network.

4. The method of claim 2, wherein the critic neural network, the actor neural network, or both include one or more batch normalization neural network layers.

5. The method of claim 2, wherein the observations received by the agent characterize states of the environment using low-dimensional feature vectors that characterize the state of the environment.

6. The method of claim 5, wherein values of different dimensions of the low-dimensional feature vectors have varying ranges.

7. The method of claim 2, wherein the observations received by the agent characterize states of the environment using high-dimensional pixel inputs from one or more images that characterize the state of the environment.

8. The method of claim 2, further comprising:
independently from updating the current values of the parameters of the actor neural network using the minibatch of experience tuples:
generating a new experience tuple, comprising:
receiving a new training observation,
processing the new training observation using the actor neural network to select a new training action to be performed by the agent in accordance with the current values of the parameters of the actor neural network,
receiving a new training reward in response to the agent performing the new training action,
receiving a new next training observation, and
generating a new experience tuple that includes the new training observation, the new training action, the new training reward, and the new next training observation; and
adding the new experience tuple to the replay memory.

9. The method of claim 8, wherein processing the new training observation using the actor neural network to select a new training action comprises:
processing the new training observation using the actor neural network to generate an initial new training action;
sampling from a noise process to obtain a noise factor; and
adjusting the initial new action by the noise factor to generate the new training action.

10. The method of claim 2, wherein updating the current values of the parameters of the actor neural network using the critic neural network comprises:
for each experience tuple in the minibatch:
processing the training observation in the experience tuple using the actor neural network in accordance with the current values of the parameters of the actor neural network to generate a next action for the training observation; and
determining a parameter update for the actor neural network based on (i) a gradient of the critic neural network with respect to the next action taken at the training observation—next action input pair and in accordance with the current values of the parameters of the critic neural network and (ii) the gradient of the actor neural network with respect to the parameters of the actor neural network taken at the training observation and in accordance with current values of the parameters of the actor neural network.

11. A system comprising one or more computers and one or more storage devices storing instructions that, when executed by the one or more computers, cause the one or more computers to perform operations for training an actor neural network used to select actions to be performed by an agent that interacts with an environment by receiving observations characterizing a current state of the environment and performing an action selected from a continuous space of actions, wherein the actor neural network maps observations to next actions in accordance with current values of parameters of the actor neural network, and wherein the operations comprise:
obtaining a minibatch of experience tuples from a replay memory, each experience tuple comprising a training observation characterizing a training state of the environment, a training action from the continuous space of actions performed by the agent in response to receiving the training observation, a training reward received by the agent for performing the training action, and a next training observation characterizing a next training state of the environment; and
updating the current values of the parameters of the actor neural network using the minibatch of experience tuples, comprising:
for each experience tuple in the minibatch:
processing the training observation and the training action in the experience tuple using a critic neural network to determine a neural network output for the experience tuple in accordance with current values of parameters of the critic neural network, and
determining a target neural network output for the experience tuple from the training reward in the experience tuple and the next training observation in the experience tuple, the determining comprising:
processing the next training observation using a target actor neural network to determine a predicted next action for the experience tuple in accordance with current values of parameters of the target actor neural network, wherein the target actor neural network is identical to the actor neural network but the current values of the parameters of the target actor neural network are different from the current values of the parameters of the actor neural network;
processing the next training observation and the predicted next action for the experience tuple using a target critic neural network to generate a predicted next neural network output in accordance with current values of parameters of the target critic neural network, wherein the target critic neural network is identical to the critic neural network but the current values of the parameters of the target critic neural network are different from the current values of the parameters of the critic neural network; and
determining the target neural network output for the experience tuple from the training reward and the predicted next neural network output for the experience tuple;
updating the current values of the parameters of the critic neural network using errors between the target neural network outputs and the neural network outputs for the experience tuples in the minibatch; and
updating current values of the parameters of the actor neural network using the critic neural network.

12. The system of claim 11, the operations further comprising:
updating the current values of the parameters of the target actor neural network using the updated values of the parameters of the actor neural network; and
updating the current values of the parameters of the target critic neural network using the updated values of the parameters of the critic neural network.

13. The system of claim 12, wherein the current values of the parameters of the target actor neural network and the target critic neural network are constrained to change slowly during the training of the actor neural network.

14. The system of claim 11, the operations further comprising:
independently from updating the current values of the parameters of the actor neural network using the minibatch of experience tuples:
generating a new experience tuple, comprising:
receiving a new training observation,
processing the new training observation using the actor neural network to select a new training action to be performed by the agent in accordance with the current values of the parameters of the actor neural network,
receiving a new training reward in response to the agent performing the new training action,
receiving a new next training observation, and
generating a new experience tuple that includes the new training observation, the new training action, the new training reward, and the new next training observation; and
adding the new experience tuple to the replay memory.

15. The system of claim 14, wherein processing the new training observation using the actor neural network to select a new training action comprises:
processing the new training observation using the actor neural network to generate an initial new training action;
sampling from a noise process to obtain a noise factor; and
adjusting the initial new action by the noise factor to generate the new training action.

16. The system of claim 11, wherein updating the current values of the parameters of the actor neural network using the critic neural network comprises:
for each experience tuple in the minibatch:
processing the training observation in the experience tuple using the actor neural network in accordance with the current values of the parameters of the actor neural network to generate a next action for the training observation; and
determining a parameter update for the actor neural network based on (i) a gradient of the critic neural network with respect to the next action taken at the training observation—next action input pair and in accordance with the current values of the parameters of the critic neural network and (ii) the gradient of the actor neural network with respect to the parameters of the actor neural network taken at the training observation and in accordance with current values of the parameters of the actor neural network.

17. The system of claim 11, wherein the observations received by the agent characterize states of the environment using high-dimensional pixel inputs from one or more images that characterize the state of the environment.

18. The system of claim 11, wherein the observations received by the agent characterize states of the environment using low-dimensional feature vectors that characterize the state of the environment.

19. A non-transitory computer-readable storage medium storing instructions that when executed by one or more computers cause the one or more computers to perform operations for training an actor neural network used to select actions to be performed by an agent that interacts with an environment by receiving observations characterizing a current state of the environment and performing an action selected from a continuous space of actions, wherein the actor neural network maps observations to next actions in accordance with current values of parameters of the actor neural network, and wherein the operations comprise:
obtaining a minibatch of experience tuples from a replay memory, each experience tuple comprising a training observation characterizing a training state of the environment, a training action from the continuous space of actions performed by the agent in response to receiving the training observation, a training reward received by the agent for performing the training action, and a next training observation characterizing a next training state of the environment; and
updating the current values of the parameters of the actor neural network using the minibatch of experience tuples, comprising:
for each experience tuple in the minibatch:
processing the training observation and the training action in the experience tuple using a critic neural network to determine a neural network output for the experience tuple in accordance with current values of parameters of the critic neural network, and
determining a target neural network output for the experience tuple from the training reward in the experience tuple and the next training observation in the experience tuple, the determining comprising:
processing the next training observation using a target actor neural network to determine a predicted next action for the experience tuple in accordance with current values of parameters of the target actor neural network, wherein the target actor neural network is identical to the actor neural network but the current values of the parameters of the target actor neural network are different from the current values of the parameters of the actor neural network;
processing the next training observation and the predicted next action for the experience tuple using a target critic neural network to generate a predicted next neural network output in accordance with current values of parameters of the target critic neural network, wherein the target critic neural network is identical to the critic neural network but the current values of the parameters of the target critic neural network are different from the current values of the parameters of the critic neural network; and
determining the target neural network output for the experience tuple from the training reward and the predicted next neural network output for the experience tuple;
updating the current values of the parameters of the critic neural network using errors between the target neural network outputs and the neural network outputs for the experience tuples in the minibatch; and updating current values of the parameters of the actor neural network using the critic neural network.

20. The computer-readable storage medium of claim 19, the operations further comprising:

independently from updating the current values of the parameters of the actor neural network using the minibatch of experience tuples:

generating a new experience tuple, comprising:
receiving a new training observation,
processing the new training observation using the actor neural network to select a new training action to be performed by the agent in accordance with the current values of the parameters of the actor neural network,
receiving a new training reward in response to the agent performing the new training action,
receiving a new next training observation, and
generating a new experience tuple that includes the new training observation, the new training action, the new training reward, and the new next training observation; and adding the new experience tuple to the replay memory.

* * * * *